UNITED STATES PATENT OFFICE.

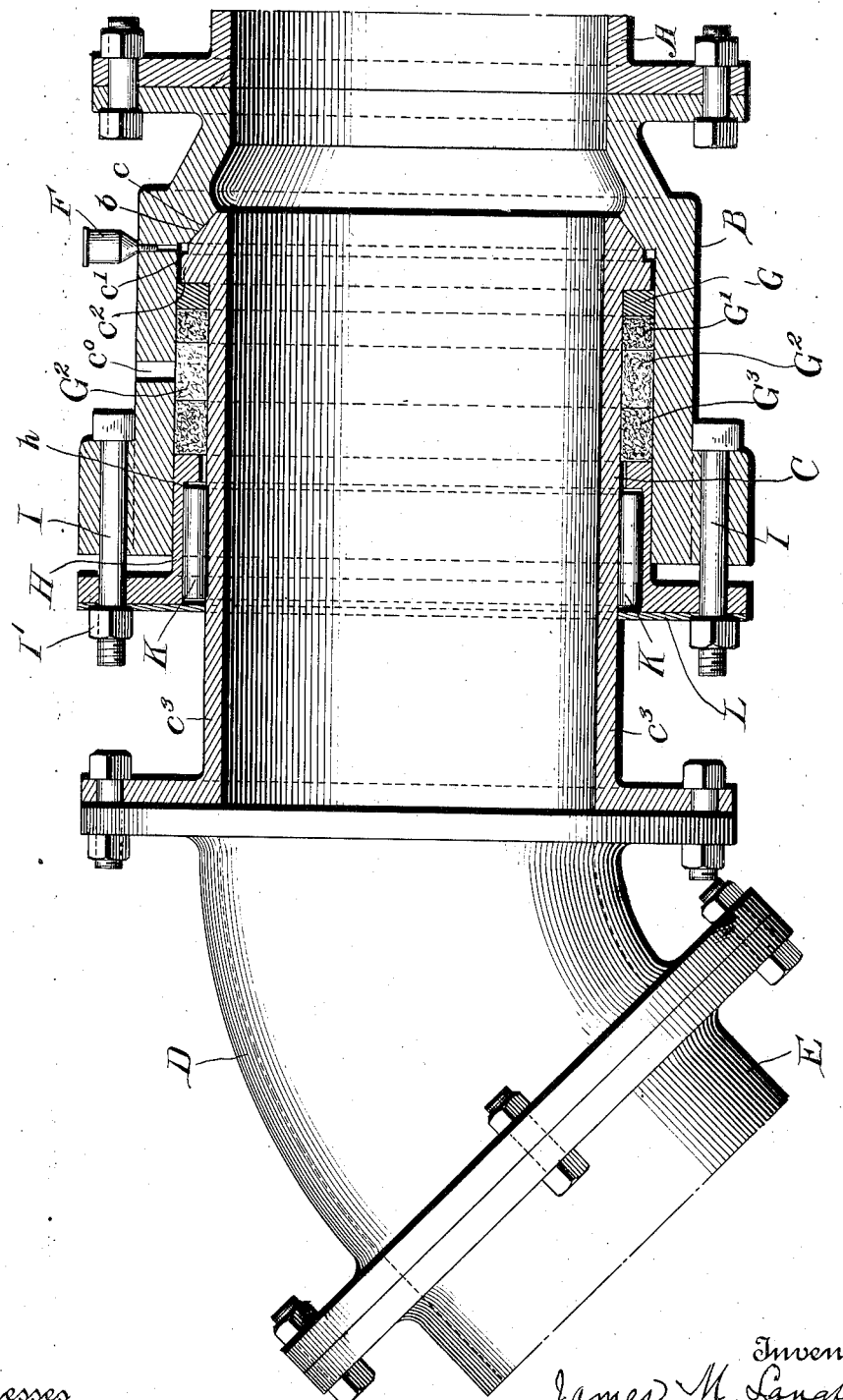

JAMES M. LANGFORD, OF MULBERRY, FLORIDA.

PIPE-COUPLING.

1,038,396.  Specification of Letters Patent.  Patented Sept. 10, 1912.

Application filed December 12, 1911. Serial No. 665,233.

*To all whom it may concern:*

Be it known that I, JAMES MADISON LANGFORD, a citizen of the United States, residing at Mulberry, in the county of Polk and State of Florida, have invented certain new and useful Improvements in Pipe-Couplings; and I do hereby declare the following to be a full, clear, and exact description of the invention, such as will enable others skilled in the art to which it appertains to make and use the same.

My invention relates to improvements in pipe couplings, and is especially intended to provide an antifrictional coupling for heavy pipes for suction dredges, or similar apparatus where it is desired to secure a revoluble joint, which may be readily turned to the desired angle, and which may be kept suitably lubricated and substantially air-tight.

My invention will be understood by reference to the accompanying drawing, in which A represents the main pipe connected to the pump, B the outer member of the revoluble coupling, C the inner member of the same, D an elbow, and E the suction pipe leading to the material to be dredged, or excavated. These various parts, A and B, C and D, and D and E, are connected together by suitable flanges and bolts, as shown. The member B of the coupling is preferably coned, as at $b$, to engage the conical face $c$ of the member C, and a lubricating groove $c'$ is provided to receive lubricant from any convenient source, as from the oil cup F. The member C is shouldered as at $c^2$, and over its cylindrical surface $c^3$ are mounted the metal packing ring G, the soft packing rings G', and the packing rings $G^2$ of a skeleton type, or permeable to water, which is supplied through the opening $c^0$ in the top of the member C. These packing rings, with the sleeve H, constitute a gland, the packing rings being held under compression by the bolts I and nuts I'. The inner face of the sleeve H is clear of the cylindrical surface of the member C, and this said sleeve is recessed, as at $h$, to receive the roller bearings K, which are held in place and protected from fouling by means of the face plate L.

It will be readily seen that the coned surfaces $b$ and $c$ automatically grind when turned, and maintain a close fit, and being lubricated, offer little resistance when the member C is turned, the further anti-friction effect being secured by the rollers K. Furthermore, by having the chamber between the shoulder $c^2$ and the sleeve H supplied with water, not only is a lubricating effect secured, but also an air-tight packing is secured, which will prevent the sucking of air through the coupling from the exterior into the pipe A.

It will be obvious that various modifications might be made in the herein described apparatus, and in the combination and arrangement of parts, which could be used without departing from the spirit of my invention.

Having thus described my invention, what I claim and desire to secure by Letters Patent of the United States is:—

1. In a pipe coupling, the combination of a fixed pipe with a hollow cylindrical casing secured thereto and provided with a conical wearing surface; of a pipe projecting into said casing and provided with a conical wearing surface engaging the wearing surface of said casing, and with a shoulder in rear of said conical wearing surface, with a cylindrical portion in rear of said shoulder; a series of packing rings mounted exterior to said cylindrical surface and between it and said casing; a sleeve mounted over said casing with means for causing said sleeve to compress said packing rings; and anti-friction rollers inclosed in said sleeve and mounted between said sleeve and said cylindrical surface, with a face plate secured to said sleeve inclosing the run way therein for said antifriction rollers, substantially as described.

2. In a pipe coupling, the combination of a stand pipe with a hollow cylindrical casing secured thereto, said casing being provided with a flange at one end, and with a conical wearing surface near the other end; of a pipe projecting into said casing, and provided at its free end with a conical wearing surface engaging the wearing surface of said casing, and with a shoulder in rear of said conical wearing surface, with a cylindrical portion in rear of said shoulder, a series of packing rings mounted exterior to said cylindrical surface and between it and said casing; a sleeve mounted over said casing, and provided with a flanged end, bolts passing through said flanged end of said casing and said flange on said sleeve, with nuts mounted on said bolts for compressing said packing rings, antifriction rollers inclosed in said sleeve and mounted between said sleeve and said cylindrical surface, and means for retaining the antifriction rollers in the run-way in said sleeve, substantially as described.

In testimony whereof, I affix my signature, in presence of two witnesses.

JAS. M. LANGFORD.

Witnesses:
H. W. PRIMM,
S. WHITFORD.